Patented Apr. 28, 1953

2,636,817

UNITED STATES PATENT OFFICE 2,636,817

METHOD OF DECREASING DROSS FORMATION IN THE MELTING OF ZINC

Maurice Daniel Knechtel, Flin Flon, Manitoba, Canada, assignor to Hudson Bay Mining and Smelting Co. Limited, Winnipeg, Manitoba, Canada, a company of Canada No Drawing. Application February 23, 1950, Serial No. 145,921. In Canada April 11, 1949

3 Claims. (Cl. 75—86)

The invention relates to the treatment of zinc sheets obtained at the cathode in the electrometallurgical recovery of zinc in order to reduce dross formation and thus reduce dross loss.

In the melting of zinc there is always a loss of metal due to dross formation. This loss is not particularly serious when zinc slabs are melted but when the thin, rough cathode sheets produced in the electrolytic method of winning zinc from ores are melted the loss is much larger. This loss is partly due to oxidation of the zinc during melting and is partly due to the difficulty in causing small particles of zinc to coalesce. The first cause cannot be corrected once it has occurred and the only remedy lies in minimizing oxidation; the second cause can be corrected by the use of various fluxes, one which is commonly used being ammonium chloride.

It is, of course, possible to recover the zinc in dross, but the methods available are difficult to carry out and expensive, and the treatment of dross has been a great source of annoyance to zinc metallurgists. Considerable attention has, therefore, been paid to the several methods which have been proposed for the treatment of zinc cathode sheets from the electrometallurgical zinc process, in order to cut down dross formation. One of the most important of such methods is that involving the washing of the cathode sheets to remove the electrolyte (commonly zinc sulphate) clinging to the sheets. The effect is to decrease the dross weight, as the sulphate does not then end up in the dross, but it is to be noted that this decrease in dross weight does not indicate any increased recovery of zinc into slab as the zinc in the electrolyte clinging to the sheets has never been reduced.

Another important method which has been proposed for reducing dross formation is to dry the cathode sheets, the proposal being based on the supposition that the water on the sheets may cause oxidation during melting. It is, of course, well known that zinc can be reacted with water at elevated temperatures.

I have discovered that a decrease of as much as 35% in dross loss may be brought about, over and above that produced by washing and drying the cathode zinc sheets to be melted, by a heat treatment prior to melting, the treatment being carried out for a period of from about 10 to about 60 minutes at a temperature above that required to evaporate moisture from the surface of the zinc and below the melting point of the zinc. The series of experiments which I have made and which I shall describe below show that the duration of the treatment varies according to the temperature at which the heat treatment is done, that a useful reduction in the dross loss is obtained with temperatures as low as about 275° C. with preheat times of 50 or 60 minutes and with temperatures as high as about 370° C. with preheat times of 10, 20 or 30 minutes, that it is desirable to hold the temperature between about 275° C. and about 295° C. with a treatment time of about 25 to 40 minutes, and that the best results are obtained on preheating the zinc at about 290° C. for about 30 minutes.

The reason for the improvement which is indicated by the experiments referred to below is not known but the hypothesis which I believe to be correct is as follows: Hydrogen under pressure is dissolved in the zinc cathode sheets and the rapid release of this hydrogen by the process of melting results in small and, therefore, easily oxidizable fragments of zinc being blown off. The effect of my preheating process is to release some or all of this hydrogen gradually so that when the zinc is melted no fragments are ejected or the number of fragments ejected is very much reduced. Thus, if the preheating temperature is too low no hydrogen will be released while if it is too high the hydrogen will be released so rapidly that particles will be blown off and no advantage will be gained. Similarly, the preheat period should not be unduly prolonged since zinc apparently oxidizes slowly during the preheating period.

The experiments referred to below were carried out with round discs ⅜" in diameter punched from zinc cathode sheets produced in the electrometallurgical process. This material is normally difficult to melt without a heavy dross loss. The discs were washed well in running water and then dried in a steam oven at a temperature somewhat above the boiling point of water for several hours. In each experiment the quantity of the discs present at the start of each experiment amounted to 450 grams, and dross loss was calculated by deducting the quantity of zinc recovered. The discs were placed in an assay crucible, were preheated for the times and at the temperatures described below and were then melted at 550° C. under a flux of zinc chloride.

A pilot test conducted in the same way as the other tests except for the absence of preheating showed an average recovery of 440.1 grams of zinc or a dross loss of 9.9 grams. Against this there were compared, first, the results of tests all carried out with a preheat temperature of 277° C., the preheat time in one test being 10 minutes, in the next 20 and so on up to 60 minutes. The results are shown in the following table:

*Table I*

| Preheat Time, Mins | 10 | 20 | 30 | 40 | 50 | 60 |
|---|---|---|---|---|---|---|
| Zinc Recovered, Gms | 439.7 | 439.5 | 440.4 | 440.8 | 441.4 | 440.8 |
| Dross Loss, Gms | 10.3 | 10.5 | 9.6 | 9.2 | 8.6 | 9.2 |

In the next series of tests the temperature was increased, two tests being run at 293° C., one at 288° C., and another at 300° C., and the results which are given in the following table show a very much improved recovery of zinc.

*Table II*

| Preheat Time, Mins | 20 | 30 | 40 | 50 |
|---|---|---|---|---|
| Temperature, °C | 293 | 288 | 293 | 300 |
| Zinc Recovered, Gms | 441.9 | 443.6 | 443.0 | 443.3 |
| Dross Loss, Gms | 8.1 | 6.4 | 7.0 | 6.7 |

Three more sets of experiments were then run at increasingly higher temperatures and it was observed that, while the recovery of zinc deteriorated, a useful reduction in dross loss was obtained at temperatures up to about 345° C. for a preheat time within the range 20–60 minutes, or as high as about 380° C. if the preheat time was limited. The results of these tests are shown in the following tables:

*Table III*

| Preheat Time, Mins | 10 | 20 | 30 | 40 | 50 | 60 |
|---|---|---|---|---|---|---|
| Temperature, °C | 332 | 327 | 321 | 316 | 304 | 316 |
| Zinc Recovered, Gms | 440.6 | 441.4 | 441.9 | 442.3 | 442.4 | 441.5 |
| Dross Loss, Gms | 9.4 | 8.6 | 8.1 | 7.7 | 7.6 | 8.5 |

*Table IV*

| Preheat Time, Mins | 10 | 20 | 30 | 40 | 50 | 60 |
|---|---|---|---|---|---|---|
| Temperature, °C | 343 | 343 | 343 | 343 | 343 | 343 |
| Zinc Recovered, Gms | 438.9 | 440.8 | 441.0 | 440.4 | 442.2 | 441.8 |
| Dross Loss, Gms | 11.1 | 9.2 | 9.0 | 9.6 | 7.8 | 8.2 |

*Table V*

| Preheat Time, Mins | 10 | 20 | 30 | 40 | 50 | 60 |
|---|---|---|---|---|---|---|
| Temperature, °C | 371 | 377 | 377 | 366 | 382 | 338 |
| Zinc Recovered, Gms | 440.5 | 440.3 | 440.6 | 439.6 | 438.9 | 439.6 |
| Dross Loss, Gms | 9.5 | 9.7 | 9.4 | 10.4 | 11.1 | 10.4 |

From the above, it will be seen that the best combinations of time and temperature may be indicated in round figures as follows:

| Preheat Time, Minutes | Best Temperature, Degrees Centigrade | Dross Loss, Grams |
|---|---|---|
| 20 | 295–300 | 8.1 |
| 30 | 290–295 | 6.4 |
| 40 | 295–300 | 7.1 |
| 50 | 300–335 | 7.0 |
| 60 | 335–340 | 8.2 |

In carrying out my invention on a commercial basis, it is preferred that the zinc be placed on a travelling belt which draws it through a heated tunnel or oven where the zinc is subjected to the desired temperature for the desired time. On emerging from the oven the zinc drops immediately into the melting furnace.

What I claim as my invention is:

1. A method of reducing dross loss on melting zinc sheets obtained at the cathode in the electrometallurgical recovery of zinc, comprising the steps of heating the zinc prior to melting for a period of from 10 to 60 minutes at a temperature between 275° and 345° C., and subsequently melting the zinc.

2. A method of reducing dross loss on melting zinc sheets obtained at the cathode in the electrometallurgical recovery of zinc, comprising the steps of heating the zinc prior to melting for a period of from 25 to 40 minutes at a temperature between 275° and 295° C., and subsequently melting the zinc.

3. A method of reducing dross loss on melting zinc sheets obtained at the cathode in the electrometallurgical recovery of zinc, comprising the steps of heating the zinc prior to melting for a period of 30 minutes at a temperature of 290°, and subsequently melting the zinc.

MAURICE DANIEL KNECHTEL.

References Cited in the file of this patent

UNITED STATES PATENTS

| Number | Name | Date |
|---|---|---|
| 1,380,767 | Booth | June 7, 1921 |
| 1,835,450 | Anderson et al. | Dec. 18, 1931 |
| 2,204,173 | Bowser, Jr. | June 11, 1940 |

FOREIGN PATENTS

| Number | Country | Date |
|---|---|---|
| 536,878 | Great Britain | May 30, 1941 |